DEVICE TO DRIVE CIRCULAR TYPE-CARRIERS

Filed Nov. 23, 1955 4 Sheets-Sheet 1

INVENTOR
G. KRATT -
O. HOLSTEIN
BY R. J. Berry
AGENT

Aug. 12, 1958 G. KRATT ET AL 2,847,505

DEVICE TO DRIVE CIRCULAR TYPE-CARRIERS

Filed Nov. 23, 1955 4 Sheets-Sheet 2

INVENTOR
G. KRATT -
O. HOLSTEIN
R. J. Berry
AGENT

DEVICE TO DRIVE CIRCULAR TYPE-CARRIERS

Filed Nov. 23, 1955 4 Sheets-Sheet 3

INVENTOR
G. KRATT -
O. HOLSTEIN
BY R. J. Berry
AGENT

DEVICE TO DRIVE CIRCULAR TYPE-CARRIERS

INVENTOR
G. KRATT -
O. HOLSTEIN
R. J. Berry
AGENT

United States Patent Office 2,847,505

Patented Aug. 12, 1958

2,847,505

DEVICE TO DRIVE CIRCULAR TYPE-CARRIERS

Gerhard Kratt, Nurnberg, and Otto Holstein, Pforzheim, Germany, assignors to International Standard Electric Corporation, New York, N. Y., a corporation of Delaware Application November 23, 1955, Serial No. 548,731

Claims priority, application Germany December 1, 1954

9 Claims. (Cl. 178—34)

This invention relates to printing machines of the office or printing telegraph type and more particularly to machines employing rotary type-carriers such as a type wheel, type roller, or type magazine. In devices utilizing typewheels, there is provided a plurality of notched discs for the selection of characters, one disc for each element of the signal code utilized, each disc spaced from and coaxial with the other discs. Extending transverse of the edges of said discs there are provided a plurality of spring-urged members so that when the discs are angularly turned with respect to each other in a predetermined fashion, a corresponding group of notches in each disc becomes aligned and one of the spring-urged members falls into the row of aligned notches and into the path of a stop arm connected to a rotating typewheel. Different of said spring-urged members are thus set for different code combinations and arrest motion of the typewheel at discrete angular positions whereby different characters may be printed. In some of these arrangements the type carrier is restored to a predetermined position of rest after the character corresponding to the received signal has been printed; in others it is moved directly from the position of printing a character into the position necessary for printing the next following one. In all these arrangements the type carrier, in order to be set to a printing position, is for any such position turned in the same direction, whereby in the extreme case the type carrier will have to make nearly a complete revolution where the next character to be printed is adjacent to the one just printed. The telegraphic speed or printing speed is thus limited.

The invention has for its object to increase this speed through arranging that the type carrier shall take the shortest path when moving from its starting-position into the position necessary for printing the next following character, such starting-position being determined, for example, by the character just printed. According to the invention a test means is arranged to ascertain in which direction the type carrier must move in order to take the shortest path when passing from its starting-position to the position predetermined by the character to be printed next, this test means determining the direction to be selected. The advantage of such an arrangement is that in the most unfavorable case (where the carrier must normally make almost a complete revolution to reach the angular position corresponding to the character adjacent the one last printed), the type carrier may make only a half-revolution in order to arrive from its starting-position to the printing-position predetermined by the next following received signal. In this way the telegraphic speed or the speed of printing is considerably increased.

The above-mentioned and other features and objects of this invention and the manner of attaining them will become more apparent and the invention itself will be best understood, by reference to the following description of an embodiment of the invention taken in conjunction with the accompanying drawings, wherein.

Figures 1, 2:
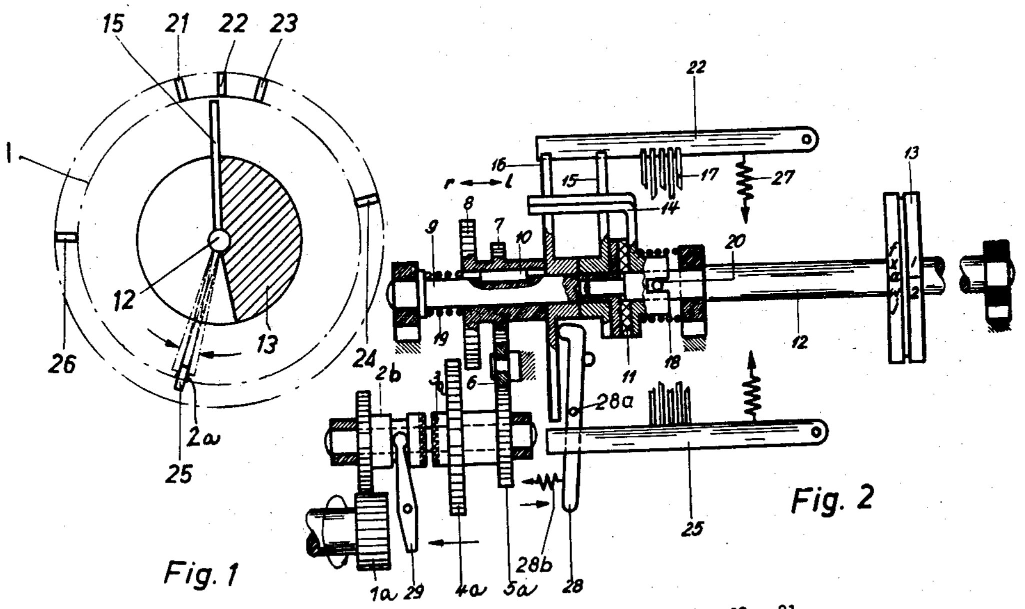
Fig. 1 is a diagrammatic representation of a rotary type carrier with its stop arm cooperating with stop members disposed about disc-type selector elements.
Fig. 2 is a diagrammatic representation partly in section of a portion of a ring selector type printing device embodying our invention.

Referring now to Fig. 1, there is shown diagrammatically one of the selection discs 1 of a printing machine having a series of notches 2*a* radially extending into the periphery of said discs, it being understood that there will be other notched discs 2 . . . 5 coaxially disposed behind disc 1 in Fig. 1. There are shown the end portions of a group of spring-urged stop members 21 . . . 26 disposed around the periphery of discs 1 . . . 5 which act to stop the arm 15 that has an end fixedly mounted radially outward on rotatable shaft 12, when the selection discs are in proper alignment. In Fig. 1, the notches 2 in the several discs are aligned so that member 25 moves into the group of slots 2 in each disc in an inwardly radial direction toward the disc axes and will block the path of stop arm 15 as shown in dotted line in the drawing.

Where, for instance, a selective ring-system is employed to translate the signal to be printed from a telegraph code, the stop members 21—26 should preferably be so constructed as to also constitute the selecting bars of that system. If the system for the translation is other than this, the stop members 21—26 must be coupled correspondingly to associated selecting members. Though the idea of invention is explained in Fig. 1 as employed in connection with an arrangement having a stop arm and stop members therefor, this idea may also be utilized with arrangements of a design other than that here shown.

In known path-integration methods, either mechanical or electrical, for driving the type carrier, which are of the kind operating on the basis of a fixed rest position for the type carrier, the total length of the path, for example, given by the received telegraph signal is a criterion required to initiate that direction of rotation which is the shortest path between successive received signals. In this case a tester is arranged to ascertain the resultant path total and to provide for the proper direction of rotation.

Path integration methods may be used in which the type carrier is moved from a printing position directly into the next following one by employing a register or store for the arriving signals. The register may be joined directly to the stop members 21—26 represented in Fig. 1. Fig. 1, according to which the at-rest positions of the stop members 21—26 are in a circle surrounding the field of motion of the seeker arm 15 while these stops are movable radially, discloses only one of the possibilities of motion. For instance, the stops 21—26 may be situated on a smaller circle concentric with the axle 12 of the type carrier, and may be introduced into the path of arm 15 by a motion which, for example, is parallel to axle 12. What is important in the meaning of the invention is that the stops 21—26 must normally be outside of the field of motion of arm 15 and that only one of them, namely the stop corresponding to the signal to be printed, shall be made to enter the field of motion of arm 15 in order to stop this arm.

Assume the type carrier 13 to be in the starting position defined by the printing of the preceding signal. Further assume that the preceding signal has been printed at an angular position governed by arm 15 having come against stop 22 shown in Fig. 1 as being out of its operative position. If the next following signal to be printed requires the stop 24 to be rotatably moved into its operative position, this stop facing the hatched sector of carrier 13, then the shortest path of carrier 13 to the new printing position will be obtained through turning it clockwise. As for rotatably moving the carrier 13 to the new printing position, the path which is the shortest in the respective case is the one to be chosen, and the invention provides an arrangement that determines that the type carrier rotation is to be either clockwise or counter-clockwise depending upon whether the stop, determining which signal is to be printed, faces either the hatched sector of carrier 13 or the blank sector thereof. As can be seen from the schematic representation of Fig. 1, the two sectors of the carrier 13 employed to predetermine the direction in which the carrier is to be turned do not comprise an angle of 180° each, since otherwise the direction of rotation for the signal opposite the arm 15 when in its starting position would be undefined. Thus, one of the two sectors of carrier 13, which are employed to define the direction in which this is to be turned, must be smaller than the other by a distance equal to the width of about one character. According to the invention one of these sectors is marked by a test disc coupled to the carrier 13 and is scanned by the stop members 21—26 or by separate members either coupled to these stops or operated conjointly with them.

In the arrangement as thus far described, the arm 15 and with it the type carrier 13 can assume two different positions with respect to any one of the stops 21—26, depending upon whether this arm is turned either clockwise or counter-clockwise. This is illustrated in Fig. 1 for stop 25. The two possible positions of arm 15 are shown in dash and dot lines. According to one feature of the invention the carrier 13 and arm 15 are coupled together by a member arranged to compensate for the angular difference that would result in the cooperation of arm 15 with any one of the stop members 21—26.

The following description, which deals with a number of embodiments of the invention, contemplates a "floating" type carrier, or one having no defined position of rest, that is, a type carrier which is moved from one printing position directly to the next following one without returning to a home or rest position. But the inventive arrangement are such as to enable its use with type carriers having a defined rest or home position.

Figure 3:
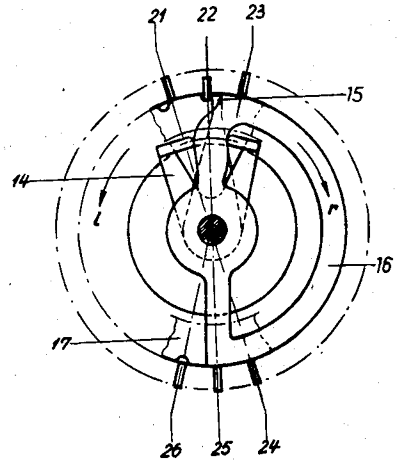
Fig. 3 is a schematic representation of a direction-determining test disc as used in the showing in Fig. 2.

Figs. 2 and 3 show one embodiment of the invention. It is assumed here that the translation of the signals is accomplished by the aid of a selective ring-system represented as to its principle by the selecting rings 17 and the stop members 21—26 (of which only members 22 and 25 are shown in Fig. 3), these members being identical with the stop members 21—26 shown in Fig. 1. A clutch portion **2*b*, driven continuously by a pinion 1*a*, can be longitudinally displaced by means of lever 29 so as to engage with the associated clutch portion 3*a*, rigidly connected with gears 4*a*, 5*a*. A pair of gears 7, 8 are keyed to shaft 9 by key 10 but are axially displaceable against the action of a compression spring 19 so that either the gears 4*a*, 8 or the gears 5*a*, 7 engage. The gear ratios of gears 4, 8 and 5, 7 are different and therefore the speed ratio of shaft 12 will be altered depending upon selective engagement of gears 7 or 8. Gear 7 is driven by gear 5*a* and an intermediate pinion 6 which causes a reversal of direction of rotation of gear 7. Thus, with the wheels 4*a*, 5*a* rotating in one direction the gears 7, 8 will rotate in an opposite direction as long as the gears 5*a*, 6, 7 are in mutual engagement. Mounted loosely on shaft 9 is the test disc 16, which in accordance with what is shown in Fig. 1 is nearly semicircular. Shaft 9 also loosely carries the seeker arm 15 which is angularly movable within the stop bars 21—26 arranged concentrically about shaft 9. When, on completion of the selection process of the selective ring-system, one of the stop bars 21—26 has engaged the row of notches of the selecting discs 17, the arm 15 when rotated will come against it. Arm 15 is situated between the two prongs 14*a* and 14*b* of a fork shaped element 14 which is rigidly connected with one portion 11*a* of a friction coupling 11. The space between prongs 14*a* and 14*b* is such that it affords some angular play to arm 15. The test disc 16 is coupled, by fork 14, to the portion 11*a* of coupling 11, and is thus coupled to the shaft 12 of the type carrier 13 in a manner to rotate therewith. The shafts 9, 12 are coupled together by the coupling 11. To permit mutual longitudinal displacement of these shafts, the shaft 12 has a stud 20 in engagement with a longitudinal slot in the sleeve of portion 11*a* of the coupling 11. A spring 18 is arranged to produce a coupling pressure. By means of the engaging lever 28, which pivots at point 28*a* the test disc 16 can be displaced so far toward the left, as viewed in the drawing, that it shall be outside of the operating-range of the stop bars 21—26. Engaging lever 28 may be pivoted counter-clockwise against tension of spring 28*b*. The gears 7, 8 share in this movement of the test disc 16 so that gear 7 will be disengaged from pinion 6 and thus from the gear 5*a* while the gear 8 will engage the gear 4**.

The arrangement represented in Figs. 2 and 3 operates as follows:

The selecting discs 17 of the selective ring-system are set in known manner by received telegraph pulses received in accordance with the signal to be printed. One of the stop members 21—26 hence finds a row of notches in the ring 17, and under the action of its spring 27, Fig. 2, snaps into these notches. This stop member is now in the path of arm 15. If that stop member, such as 22, also is in the operating-range of the test disc 16, then it will now be bearing against the edge of this disc. An incoming pulse moves the engaging lever 28 against the action of spring **28*b*, whereby the test disc 16 will be displaced axially toward the left as viewed in Fig. 2. The gears 7, 8 share in its movement. Thereby gear 7 is disengaged from pinion 6 while gear 8 is brought into engagement with gear 4*a*. The stop member 22, which has been bearing against the edge of disc 16, can now, under the action of spring 27, complete its motion toward the middle of the selecting rings 17. On cessation of the received pulse the lever 28 returns to normal. Disc 16, however, can not share in this motion because the end of the stop member 22, abuts against disc 16, this member having meanwhile entered the notches in the rings 17 entirely. The gears 4*a*, 8 hence remain in mutual engagement while the gear 5*a*, 7 remain out of engagement with each other. Now lever 29 is operated to render the clutch 2*a*, 3*a*, effective. The rotation of pinion 1*a* is thereby imparted over gears 4*a*, 8 to shaft 9. Shaft 9 by means of the friction coupling 11 drives the shaft 12 of the type carrier 13 until the arm 15** comes against the respective stop member, such as 22, which lies within the row of aligned notches of the rings 17. Fork 14, fixedly coupled to shaft 9, is also rotated taking the arm 15 with it. Irrespective of the direction of rotation of arm 15, the clutch 2*a*, 3*a* is kept engaged by lever 29 until shaft 9 shall have made a little more than a half-revolution. The pinion 1*a* rotates in the direction shown by the curved arrow and with the gears 4*a*, 8 in mutual engagement, the type carrier 13 is turned counter-clockwise as viewed from the right in the drawing. When the respective signal has been printed, the stop member such as 22 returns to normal. Disc 16 thus will be restored to normal by spring 19 acting against the gears 7, 8 because stop member 22 no longer abuts thereagainst. The gear 7 thus reengages with pinion 6 under urging of spring 19.

If, however, the respective one of the stop members 21—26, which has entered into a row of notches of the rings 17, is not within the range of the test disc 16, then this disc is free to move axially to the right when lever 28 pivots in a clockwise direction, enabling gear 7 to reengage with pinion 6 upon the return of lever 28 to the position shown in Fig. 2. Consequently, when now by the aid of lever 29 the pinion 1*a* will be coupled to shaft 9 in the manner just described, this shaft will be driven in a direction the reverse of that in the former case, that is, will be turned clockwise. The other operations causing the arm 15 to come against the respective stop member 21—26 are the same as before described. In this case, after the signal has been printed the test disc 16 has already reassumed its starting-position.

As stated with reference to Fig. 1, it is necessary for a correction to be provided depending upon the direction in which arm 15 is turned to come against the selected stop member 21—26.

Figure 4:
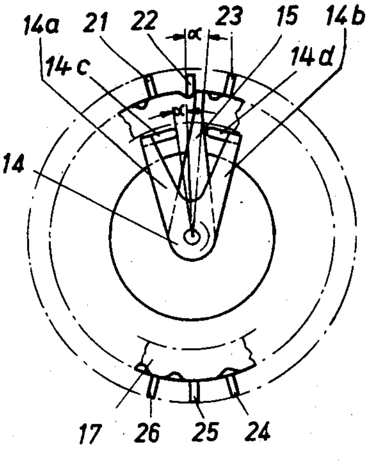
Fig. 4 is a schematic representation of one mode of operation of a correcting device as utilized in the embodiment of Fig. 2.
Figure 5:
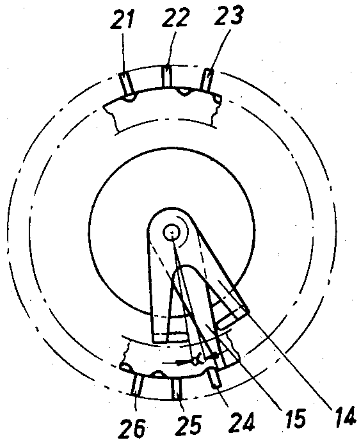
Fig. 5 is a schematic representation of another mode of operation of a correcting device as utilized in the embodiment of Fig. 2.

Figs. 4 and 5 illustrate the correcting device as employed with the arrangement shown in Figs. 2 and 3. As already explained, the forked element 14, fixedly coupled to the shaft 12 of the type carrier, takes with it the arm 15. According to the invention the clearance or room for play between arm 15 and the prongs 14*a*, 14*b* of fork 14 is a predetermined angular quantity $\alpha$ so that owing to this clearance the difference of the two possible postions of arm 15 with respect to the respective stop member 21—26, such difference being due to arm 15 rotating either to the right or to the left of member 21 . . . 26, as shown in Fig. 1, shall just be compensated, because through rotation to the right the arm 15 comes against a prong projection 14*c* whereas through rotation to the left it comes against prong projection 14*d*, as will be understood from Figs. 4 and 5. The magnitude of the angle $\alpha$ is determined by the dimensions of those parts of arm 15 and of the stop bars 21—26 that come to bear against each other, as can be gathered from the inscription in Fig. 4.

Figure 7:
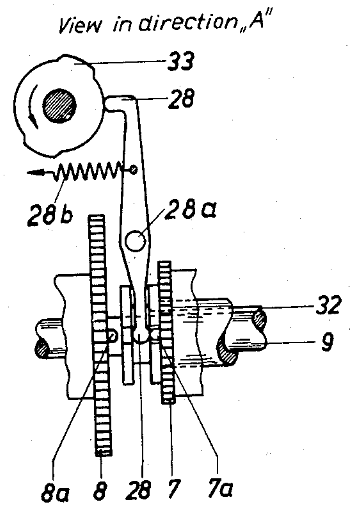
Fig. 7 is a schematic representation of a selective drive mechanism to be used in connection with the embodiment shown in Fig. 6.
Figures 6, 8:
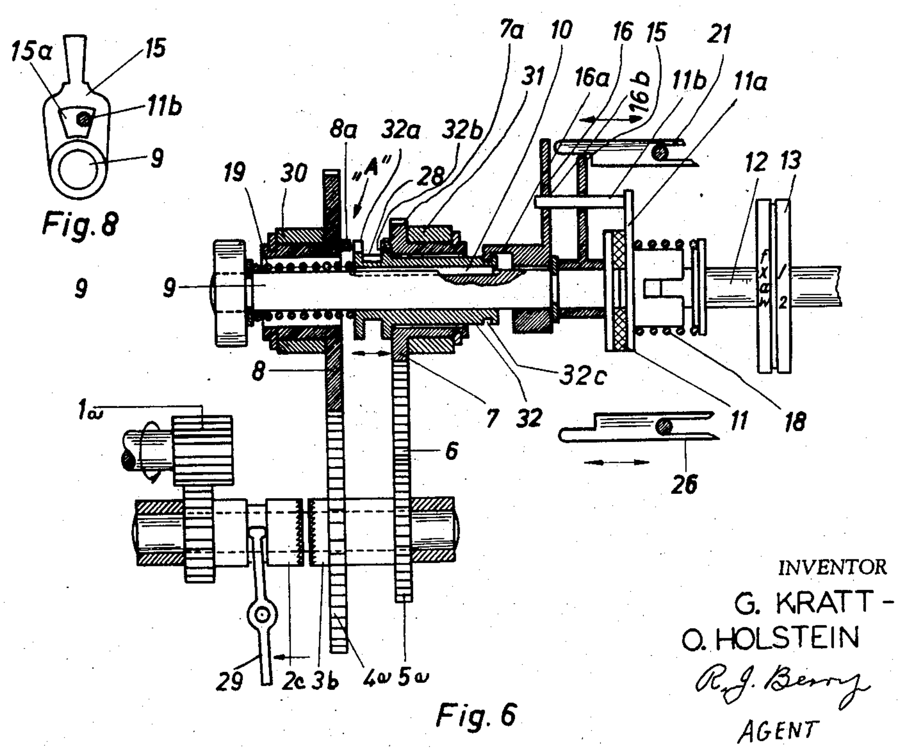
Fig. 6 is a schematic representation partly in section of another embodiment of our invention.
Fig. 8 is a diagrammatic representation of a seeker arm as used in the embodiment shown in Figs. 6 and 7.

Another example, likewise purely mechanical in operation, is shown in Figs. 6 and 7. The parts 1, 29, 2, 3, 4, 5, 6 are arranged as described with reference to Figs. 1 and 2.

The gears 7, 8 are mounted in bearings 30, 31 and have each a stud 7*a*, 8*a* extending outwardly from the flat face of the respective gears. These studs face each other and are arranged to engage each with a notch 32*a*, 32*b* provided in a coupling sleeve 32 which is keyed to shaft 9 by a key 10 but which sleeve can be displaced axially with respect to the compression spring 19. Depending upon its position the sleeve 32 will be coupled either to the gear 8 or to the gear 7 by the aid of either one or the other of its notches 32, 32*b*, and by means of the corresponding studs 8*a*, 7*a* cooperating therewith. The displacement of sleeve 32 is accomplished by the engaging lever 28 which is under control of a cam disc 33, Fig. 7. Mounted loosely on shaft 9 is the test disc 16 which similarly to Fig. 3 is nearly semicircular. Disc 16 has a hooked portion 16*a* for engagement with a circular groove 32*c* of sleeve 32 and hence shares in any axial displacement thereof but does not share in any rotation of this sleeve. Shaft 9 drives the shaft 12 of the type carrier 13 through the friction coupling 11. The portion 11*a* of this coupling is attached to shaft 12 and has a pin 11*b* for engagement with arm 15 and disc 16. Arm 15 has a slot 15*a* for this engagement. Disc 16 has a hole 16*a* therethrough to accommodate pin 11*b* without any clearance. It will be seen that, similarly to the arrangement shown in Figs. 2 and 3, the type carrier 13 is coupled to the test disc 16 by means of shaft 12, coupling-portion 11*a*, and pin 11*b* in a manner to rotate along with shaft 12. Disc 16 will thus always be in the same angular position with respect to the type carrier 13. The stop members 21—26, which correspond to the signals, are situated concentrically to shaft 9. It is assumed that each signal arriving will cause a predetermined one of these stop bars to move parallel to shaft 9 and toward the left in the drawing.

The arrangement according to Figs. 6 and 7 acts as follows:

Before the received telegraph signal is translated by the selecting system (not shown here) the lever 28 is pivoted in a clockwise direction by the cam disc 33 against the action of its spring 28*b*. Under control of lever 28 the coupling sleeve 32 is moved axially to the left so as to discharge with gear 7 and engages the gear 8. Thereupon the said selecting system acts to translate the arriving telegraph signal, whereby one of the stop members 21—26 is moved out toward the left. The stop member is in any case free to make this motion because the test disc 16 has shared in the motion of sleeve 32 owing to hooked portion 16*a*. The stop member will be held in this position by a means not shown. The member 21—26 so selected, having been moved out toward the left, thus extends into the path of arm 15. After the selection of the stop member has been completed, the lever 28 rides down cam portion of disc 33 and can hence return to its at-rest position as shown in Fig. 7, unless this return motion is prevented by the selected stop member being in the operating-range of the test disc 16, whereby sleeve 32 will be unable to slide back toward the right as viewed in the drawing. In this event the sleeve 32 remains under control of gear 8. By means of lever 29 the clutch 2*c*, 3*b* is now rendered effective, so the pinion 1 will drive the shaft 9 through the aegis of the gears 4*a*, 8, sleeve 32, and key 10. Shaft 9 drives the shaft 12 and with it the type carrier 13 by means of the friction coupling 11. The coupling portion 11*a* by means of the pin 17*b* takes the arm 15 with it. Through arm 15 coming against the selected stop member 21—26, further rotation of shaft 12 will be prevented. Irrespective of the direction traveled by arm 15, the clutch 2*a*, 3*a* will be held in its effective condition until shaft 9 shall have made exactly a half-revolution or a multiple thereof in order that the studs 7*a*, 8*a* may be facing the respective grooves of sleeve 32. After the signal has been printed and the locking device, not shown, has been released, the selected stop member 21—26 returns to normal in moving toward the right as viewed in the drawing. The test disc 16 and coupling sleeve 32 share in this motion and thus likewise return to their at-rest positions.

If, however, the selected stop member 21—26 is not in the operating-range of disc 16, then lever 28 on leaving the cam portion of disc 33 can return into its position of rest and thus displace the sleeve 32 and disc 16 toward the right. Thereby the engagement of sleeve 32 with wheel 7 will be reestablished, such engagement having existed with these two at normal. When now the clutch 2*a*, 3*a* is operated shaft 9 will be driven by the action of the gears 5*a*, 6, 7 and will thus rotate in the direction the reverse of that in the former case. After the signal has been printed, the sleeve 32 and with it the lever 28 and test disc 16 are in their starting-positions.

In this embodiment of the invention, compensation for the difference between the two possible positions of arm 15, which are due to this arm being turned either to the right or to the left, is accomplished in such a way that the pin **11*b* projects into a sector-shaped or long-slot aperture 15*a* of arm 15, as shown in Fig. 8. The mode of action of this arrangement is the same as that in the case of Figs. 4 and 5. The same clearance or room for play exists for the pin 11*b* within aperture 15*a* as the spacing between 14*c* and 14*d*** in Figs. 4 and 5.

The advantage which the arrangement shown in Figs. 6 and 7 has over that of Figs. 2 and 3 is, first of all, that the gears **4*a*, 8 and 5*a*, 6, 7** remain continuously meshed in the manner herebefore described, so the difficulties experienced in throwing such gears into mesh, will be avoided. Another advantage of the arrangement represented in Figs. 6 and 7 over what is shown in Figs. 2 and 3 is that the mass to be moved by the engaging lever is less than in the latter case.

Figures 9, 10:
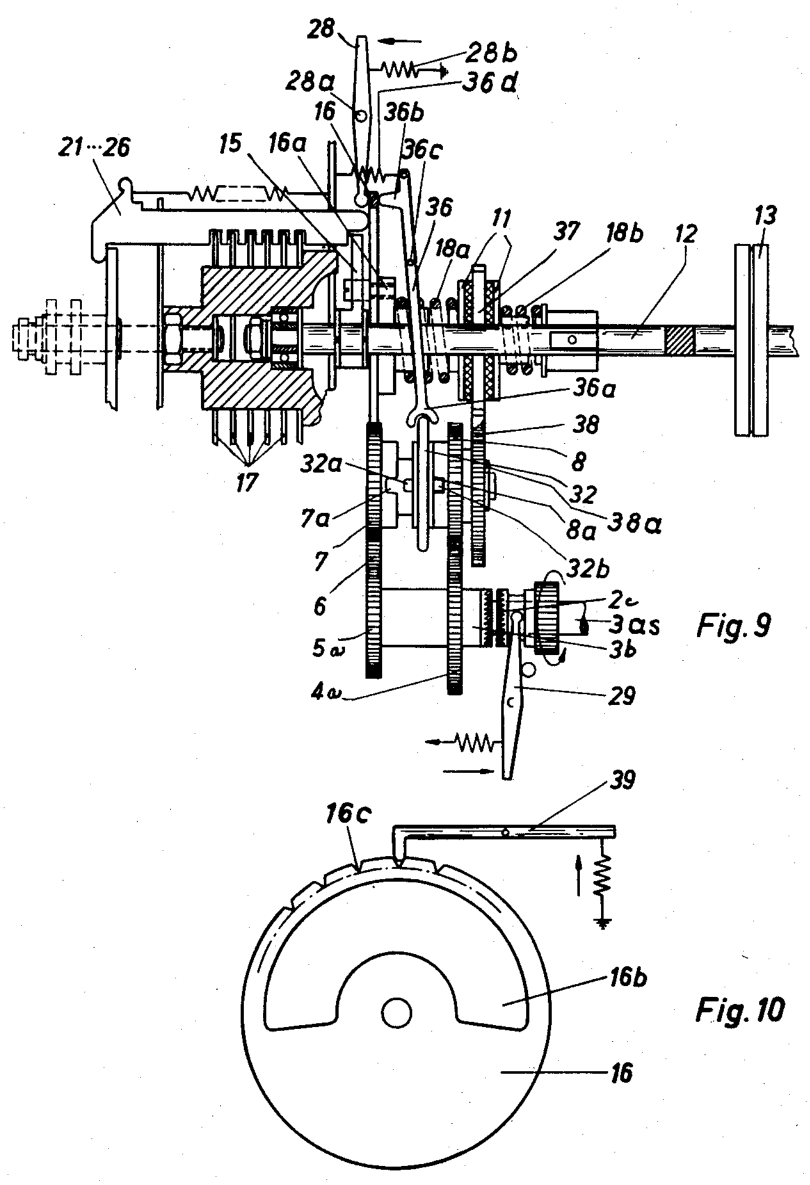
Fig. 9 is a diagrammatic representation partly in section of a further embodiment of our invention.
Fig. 10 is a diagrammatic representation of a test disc as used in the embodiment shown in Fig. 9.

Another embodiment is illustrated in Figs. 9 and 10. This arrangement is substantially similar to that of Figs. 6 and 7 but involves certain characteristic features by which it is distinguished therefrom. Just as in the case of Figs. 6 and 7, the gears 8 and 7 are driven by the gears **4*a* and 5*a*, 6, respectively, and the wheels 4*a*, 5*a* can be coupled by clutch 2*c*, 3*b* to the driving shaft 3*as* which revolves continuously. For driving the seeker arm 15 in this embodiment, we provide a coupling element 32 which comprises a disc with laterally extending studs 32*a*, 32*b* arranged to engage with grooves 7*a*, 7*b* cut into the hub portion 7, 8. The coupling arrangement is reversible by means of a fork 36 which, with its prongs or claw 36*a* straddles the peripheral edge of coupling disc 32. This fork is constructed as a double-armed lever and is arranged to pivot about point 36*c*. The fork has a tappet 36*b* at its arm remote from the claw 36*a*. Tappet 36*b* is urged continuously against one side of the edge of the test disc 16 by spring 36*d*. In distinction over the arrangements previously described herein, the shaft 12 of the type carrier extends right through the friction coupling 11 and is mounted within the axis of the selective ring-system. Owing to the fact that shaft 12 is mounted within this system, tolerances of the operating-range of arm 15 with respect to the circular assembly of the stop bars 21—26 will be kept down considerably. The two outer portions of the friction coupling 11 are rigidly fixed to shaft 12 and rotate therewith. These two coupling parts are urged by springs 18*a*, 18*b* against a gear 37, sandwiched between them. Gear 37 is continuously meshed with a gear 38 which is rigidly coupled to a hollow idler shaft 38*a*. Coupling disc 32 is slidably mounted on shaft 38*a*. Shaft 12 also has the test disc 16 and the arm 15 mounted on it. Disc 16 is so coupled to shaft 12 as to share in the rotation thereof, and takes with it the arm 15 by means of laterally extending pin 16*a* that projects into a long-slot of arm 15. The test disc 16 is shown in elevation in Fig. 10. In contrast to the test discs of the arrangements heretofore described, the test disc 16 shown in Fig. 10 is in the shape of a complete circle and has a concentric aperture 16*b* somewhat in the shape of a semi-circular slot, although the length of the slot exceeds half a circle. The stop members 21—26 are arranged to enter this aperture. The disc 16 also has as many notches 16*c* about its outer peripheral edge as there are signals to be printed. An arresting member 39, externally controlled, can snap into any one of these notches. Just as in the arrangements described above, the long-slot 15*a* in the arm 15 is so dimensioned as to compensate for the difference in the positions which this arm would assume when turned to respective sides of a stop member. Before the respective one of the stop members 21—26 snaps into a row of notches of the selecting rings 17, the test disc 16 can be displaced by means of the pivoted engaging lever 28** so far toward the right, as viewed in Fig. 9, that the selected stop bar shall be free to move.

This arrangement operates as follows:

After selection of the signal, one of the stop members 21—26 is displaced toward the right into the respective row of notches of the selecting rings 17, and is thereby placed into the path of arm 15. Before this motion of the selected stop member takes place, the test disc 16 is shifted by lever 28 so far to the right that the stop member shall be free to move. The selected stop member when in this position is locked by a device not shown. When lever 28 is left free, the test disc 16, is acted upon by the compression spring **18*a*, and tends to return towards the left to its original position but can do so only if the selected stop member is within the range of the aperture 16*b* of disc 16. Otherwise the disc 16 will abut against the selected stop bar. The position of disc 16 is transferred by fork 36 to the coupling disc 32, which then acts to couple the gear 38 either to gear 7 or to gear 8. Thereupon the meshed gears are coupled by means of clutch 2*c*, 3*b* to the continuously revolving driving shaft 3*as*. Depending upon the position of the coupling disc 32 the gear 38 turns the gear 37 either to the right or to the left. Gear 37 by means of the friction coupling 11 takes with it the shaft 12 of type-carrier 13 until arm 15 comes against the selected stop member 21—26. Irrespective of the position of this member the coupling disc 32** makes exactly a half-revolution or a multiple thereof.

After rotation of shaft 12 the type carrier 13 is set to the new printing position, the arresting member 39, actuated from without, is urged against the outer periphery of test disc 16 and, with the aid of the notches **16*c* in this disc, acts to compensate for inaccuracies to which the operative positions of disc 16** may be subject in consequence of tolerances of manufacture or of wear.

The other operations are similar to those which have been described with respect to Figs. 6 and 7.

With the two arrangements shown in Figs. 6 and 9, the coupling device between element 32 and the gears 7, 8 may be a multi-geared coupling or the like. Where such a multi-geared coupling or its equivalent is adopted, the previously mentioned requirement, namely, that the clutch **2*c*, 3*b* must cause the shaft 9** to make a half-revolution or a multiple thereof, will be dispensed with.

Figures 11, 12, 13:
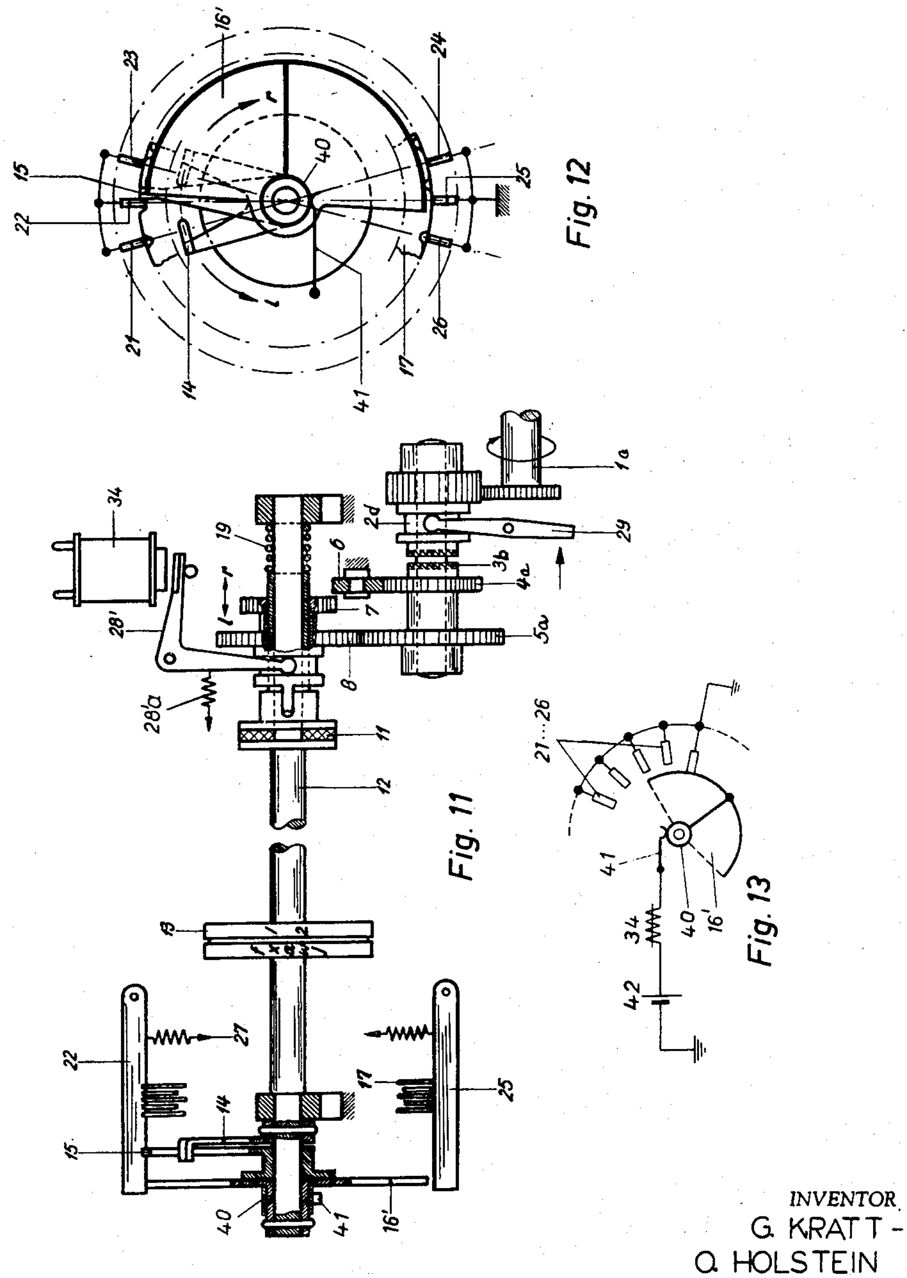
Fig. 11 is a diagrammatic representation partly in section of a still further embodiment of our invention.
Fig. 12 is a schematic representation of the mode of operation of a correcting device as utilized in the embodiment of Fig. 11.
Fig. 13 is a schematic diagram of the electrical control circuit used in connection with the embodiment shown in Figs. 11 and 12.

A further embodiment of the invention is represented in Figs. 11, 12, 13. What is peculiar to this construction is that the direction of rotation of type carrier 13 is controlled electromagnetically. The driving assembly in Fig. 11 is similar to that shown in Figs. 2 and 3 and need not be again explained. The action through which the gears 7, 8 are coupled selectively to the gears **5*a*, 6 is accomplished by the engaging lever 28′, here constructed in the shape of a bell crank lever which is the armature of a power magnet 34. Just as in the case of Figs. 2 and 3 the shaft 12 and type carrier 13 are driven by the intermediacy of a friction coupling 11. The test disc 16 is fixed to the shaft 12 of type carrier 13. A fork 14, fixed to shaft 12, takes with it the seeker arm 15, rotatably mounted on shaft 12. Just as with the embodiments heretofore described, a certain clearance or room for play is provided between fork 14 and arm 15 in order to compensate for the aforesaid difference to which the operative positions of arm 15 are subject as previously stated. The test disc 16′ here employed has a conductive coating arranged on its circumference but insulated from it and connected electrically with an insulated slip ring 40. The electrical connection between disc 16′ and the respective other parts is afforded by electrical brush 41 contacting the slip ring 40. The circuitry of the system is shown schematically in Fig. 13. Current flows from a battery 42 through the winding of magnet 34 over brush 41 and slip ring 40 to the test disc 16′**. When the stop member selected from among the members 21—26 has snapped into the respective row of notches of the selecting rings 17, this bar will in a given case bear against the disc 16 and thus close the circuit of magnet 34, as will appear from Fig. 13. Just as in the case of Figs. 2 and 3, the stop bars 21—26 are arranged to cooperate with a selective ring system that comprises the selecting rings 17.

This arrangement acts as follows:

When the signal has been selected, one of the stop members 21—26 has snapped into the respective row of notches of the selecting rings 17 and has thereby placed itself into the path of arm 15.

If the selected stop member is in the operating-range of disc 16′, it cooperates with this disc to close the circuit of magnet 34. Magnet 34 hence attracts the lever 28′ against the action of the draw spring 28′*a* thereof. Lever 28′ is thus so turned as to shift the two gears 7, 8 in a right hand direction against the action of the compression spring 19. Thereby the gear 7 is brought into mesh with pinion 6 while gear 8 is brought out of mesh with the gear 5. The type carrier 13 is then set to its operative position in exactly the same manner as described for Figs. 2 and 3. As soon as the signal has been printed, the selected stop member 21—26 withdraws from the test disc 16, whereby magnet 34 becomes deenergized while the gears 7, 8 will be returned to normal position toward the left by the compression spring 19.

If, however, the selected stop member 21—26 is not in the operating-range of disc 16, then the circuit of magnet 34 will not be closed, so the gears 7, 8 will remain in the position shown in Fig. 11.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In a printing device utilizing a rotating type carrier, apparatus for controlling the direction of rotation of said carrier from an angular position corresponding to a previously printed character over the shortest possible path to another angular position corresponding to the next character to be printed, comprising drive means, angular position selection means, a plurality of stop members under control of said selection means, detecting means coupled to said carrier for detecting the actuation of a stop member within a predetermined arc from a previously selected stop member and direction-reversing means adapted to be selectively coupled between said drive means and said carrier under control of said detecting means when a stop member is actuated within the length of said arc.

2. In a printing device as claimed in claim 1, wherein said detecting means comprises a test element having two operating ranges, a first of said ranges adapted to cooperate with an actuated stop member.

3. In a printing device as claimed in claim 1, wherein said angular position selecting means comprises a seeker arm coupled to said carrier and adapted to rotate therewith, said arm adapted to abut against opposite surfaces of an actuated stop arm dependent upon the direction of rotation of said carrier.

4. In a printing device as claimed in claim 1, wherein said detecting means comprises a substantially semi-annular shaped element having a peripheral surface less than a semi-circle.

5. In a printing device as claimed in claim 4, further comprising means to cyclically displace said element axially with respect to said type carrier, an actuated stop arm adapted to abut against the face of said element upon the end of a displacement cycle if within the length of the arc of said element, thereby to prevent the axial return of said element.

6. In a printing device as claimed in claim 5, wherein said direction reversing means comprises a reversing gear train.

7. In a printing device as claimed in claim 1, wherein said detecting means comprises a semi-annular shaped member made of electrically conductive material, each of said stop members made of electrically conductive material and electrically insulated from said member, electromagnetic clutch means for selectively controlling operation of said direction-reversing means, a source of potential, a series circuit including said clutch means, said member, said source and each of said stop members, whereby said clutch means is adapted to be actuated when an actuated stop member contacts said shaped member.

8. In a printing device as claimed in claim 6, wherein said direction reversing means comprises a pair of driven gears coupled to said carrier and adapted to impart rotary motion thereto, said gears axially movable of said carrier, one of said gears adapted in an axially displaced position to mesh with said drive means to rotate said carrier in a first direction and the other of said gears adapted in the axially undisplaced position to mesh with said drive means to rotate said carrier in an opposite direction.

9. In a printing device as claimed in claim 6, wherein said direction-reversing means comprises a driven gear coupled to said carrier, an intermediate splined drive shaft having an intermediate driving gear fixedly attached thereto, said intermediate driving gear in mesh with said driven gear, a main driving shaft having a pair of main driving gears fixedly attached thereto, a pair of intermediate driven gears rotatably mounted on said intermediate shaft, a spur gear meshed between a first one of said main driving gears and one of said intermediate driven gears, said other main driving gear in mesh with said other intermediate driven gears, a clutch element adapted to selectively couple said intermediate shaft to said two intermediate driven gears, said clutch under control of said detector means.

References Cited in the file of this patent

UNITED STATES PATENTS

| | | |
|---|---|---|
| 2,358,477 | Salmon | Sept. 19, 1944 |
| 2,680,970 | Durkee | June 15, 1954 |